United States Patent
Wagner et al.

(10) Patent No.: US 6,813,879 B2
(45) Date of Patent: Nov. 9, 2004

(54) METHOD FOR HEATING UP CATALYSTS IN THE EXHAUST GAS OF INTERNAL COMBUSTION ENGINES

(75) Inventors: Jens Wagner, Stuttgart (DE); Andreas Roth, Muehlacker-Lomersheim (DE); Holger Bellmannn, Ludwigsburg (DE); Detlef Heinrich, Ludwigsburg (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,308
(22) PCT Filed: Aug. 30, 2001
(86) PCT No.: PCT/DE01/03230
§ 371 (c)(1), (2), (4) Date: Mar. 3, 2003
(87) PCT Pub. No.: WO02/18764
PCT Pub. Date: Mar. 7, 2002

(65) Prior Publication Data
US 2003/0177761 A1 Sep. 25, 2003

(30) Foreign Application Priority Data
Sep. 2, 2000 (DE) .......................................... 100 43 366

(51) Int. Cl.[7] .............................................. F01N 3/00
(52) U.S. Cl. .............................. 60/284; 60/274; 60/285
(58) Field of Search .......................... 60/274, 284, 285, 60/286, 295, 301

(56) References Cited

U.S. PATENT DOCUMENTS

| 5,590,521 A | 1/1997 | Schnaibel et al. |
|---|---|---|
| 5,642,705 A | 7/1997 | Morikawa et al. |
| RE36,737 E | 6/2000 | Brehob et al. |
| 6,438,943 B1 * | 8/2002 | Yamamoto et al. ............ 60/274 |
| 6,510,834 B1 * | 1/2003 | Tomita et al. ............... 123/295 |
| 6,512,983 B1 | 1/2003 | Bauer et al. |

FOREIGN PATENT DOCUMENTS

| DE | 198 36 955 | 3/2000 |
|---|---|---|
| DE | 198 50 586 | 5/2000 |
| EP | 1 026 374 | 8/2000 |
| JP | 10 153138 | 6/1998 |
| JP | WO 00 08328 | 2/2000 |
| JP | 2000 130212 | 10/2000 |

* cited by examiner

Primary Examiner—Thomas Denion
Assistant Examiner—Diem Tran
(74) Attorney, Agent, or Firm—Walter Ottesen

(57) ABSTRACT

A heating of a catalytic converter in the exhaust gas of an internal combustion engine is presented which can be operated in different operating modes and wherein at least one of several heating measures can be selected so that, at first, an estimate can be made for several heating measures as to whether an individual heating measure can make the desired heating effect available and that it is further estimated whether an individual heating method can be carried out in the instantaneous operating state with a view to the exhaust-gas values and the operating mode of the internal combustion engine, which is necessary for carrying out the heating measure; and that that operating mode is requested wherein the requests can best be satisfied and that at least one possible heating measure is activated in dependence upon the instantaneous mode of operation. The invention further is directed to an electronic control unit for carrying out the method.

9 Claims, 2 Drawing Sheets

METHOD FOR HEATING UP CATALYSTS IN THE EXHAUST GAS OF INTERNAL COMBUSTION ENGINES

This application is the national stage of PCT/DE01/03230, filed on Aug. 30, 2001, designating the United States.

BACKGROUND OF THE INVENTION

Catalytic converters in the exhaust gas of internal combustion engines need a specific minimum temperature (light off temperature) in order to develop their toxic substance converting operation. This temperature is to be reached as rapidly as possible after a cold start. In engines, which are operated with a lean air/fuel mixture (for example, in engines having gasoline-direct injection and nitrogen oxide storage catalytic converters), additional requirements, which are in part changing requirements, are imposed on the catalytic converter temperature, for example, because of a necessary desulfatization of the storage catalytic converter during driving operation. A desulfatization requires, for example, temporarily a higher catalytic converter temperature than during normal operation for the storage of the nitrogen oxides.

Measures are already known for heating catalytic converters. For example, the engine combustion can take place with so rich a mixture that the exhaust gas still contains uncombusted fuel. The supply of secondary air to the exhaust gas causes a reaction-capable mixture to form which heats up the catalytic converter via an exothermal reaction.

Furthermore, the engine combustion can take place with so lean a mixture that the exhaust gas still contains uncombusted oxygen. In this case, a reaction-capable mixture can be generated by the metering of fuel to the exhaust gas.

It is further known to heat up the catalytic converter via the consequences of a deterioration of the efficiency of the engine combustion. A deterioration of efficiency of the engine combustion can, for example, be introduced by a deviation of the ignition time point from the optimal time point. The optimal time point is defined by the maximum efficiency. Because of the reduction of efficiency, the exhaust gas is hotter in comparison to the operation without a loss in efficiency. Accordingly, the exhaust gas develops an increased heating in the catalytic converter.

In engines having gasoline-direct injection, different modes of operation of the engine permit different measures for heating the catalytic converter.

An engine control program is known from U.S. Pat. No. 6,394,063 which controls the switchover between stratified operation and homogeneous operation.

In stratified operation, the engine is operated with an intensely stratified cylinder charge and high air excess in order to achieve the lowest possible fuel consumption. The stratified charge is achieved via a late fuel injection which, in the ideal case, leads to a partitioning of the combustion chamber into two zones: the first zone contains a combustible air/fuel mixture cloud at the spark plug. The first zone is surrounded by the second zone and this second zone comprises an insulating layer of air and residual gas. The potential for optimizing consumption results from the possibility of operating the engine substantially unthrottled while avoiding charge exchange losses. The stratified operation is preferred at comparatively low loads.

At higher load, when the power optimization is primary, the engine is operated with a homogeneous cylinder charge. The homogeneous cylinder charge results from an early fuel injection during the induction operation. As a consequence, a longer time up to the combustion is available for mixture formation. The potential of this operating mode for power optimization results, for example, from utilizing the entire combustion chamber volume for filling with a combustible mixture.

An exhaust-gas composition can be adjusted for heating an NOx-storage catalytic converter in homogeneous operation with this exhaust-gas composition deviating from the stoichiometric exhaust-gas composition.

In gasoline-direct injection engines, the possibility is further provided of targetly injecting fuel into the cylinder in the expansion stroke after the engine combustion when operation is with air excess, that is, preferably, in stratified operation. Here, the after-injected fuel partially reacts with the air excess of the engine combustion partially already in the combustion chamber and partially in the exhaust-gas system. The heat, which is released by the exothermal reaction, heats the catalytic converter.

SUMMARY OF THE INVENTION

The task of the invention is to select an optimal heating strategy in each operating state.

The heating of a catalytic converter in accordance with the invention takes place in the exhaust gas of an internal combustion engine which can be operated in different operating modes and wherein at least one of several heating measures can be selected so that at first, for several heating measures, an estimate is made as to whether an individual heating measure can make available the wanted heating effect and that it is further estimated whether an individual heating measure can be carried out in the actual operating state with a view to the exhaust-gas values and the operating mode of the engine necessary for carrying out the heating measure and that that operating state is requested in which the requirements can be best satisfied and that at least one possible heating measure is activated in dependence upon the instantaneous mode of operation. The instantaneous operating state is characterized, for example, by values for the catalytic converter temperature, the vehicle speed and the instantaneous load.

One embodiment is characterized in that a deterioration in the efficiency of the engine combustion takes place as a function of a change of the ignition angle as one measure.

A further measure provides that, as a second measure, a fuel after-injection takes place after the combustion in an engine having gasoline-direct injection.

A further measure provides that the after-injection is combined with stratified operation.

Another measure provides that the air quantity, which is inducted by the engine, is throttled to the extent that the necessary heat flow is achieved at a requested temperature.

A further measure provides that an exhaust-gas composition is adjusted in homogeneous operation for heating an NOx-storage catalytic converter with this exhaust-gas composition deviating from the stoichiometric exhaust-gas composition.

The invention is also directed to an electronic control unit for carrying out the measures and method steps.

The various operating modes of the internal combustion engine having gasoline-direct injection permit different measures for heating the catalytic converter. The allocation of the invention of heating measures and operating modes makes possible an optimization of the heating strategy with a view to the operating state of the vehicle, which, for example, is determined by parameters such as catalytic converter temperature, vehicle speed and torque requirement.

Advantageously, the possible heating effects of various catalytic converter heating measures are estimated and compared to the heating action needed. The heating action needed for heating a catalytic converter leads, for example, to physical requests as to the quantity and the temperature of the exhaust-gas flow which must be made available via the heating measure.

Furthermore, the operating limits for the individual modes of operation are considered. In this way, it is possible to select an optimal heating strategy in each operating mode.

All requirements for active heating measures are formulated as heat flow requests and temperature requests in the exhaust gas. In this way, all requests can be handled in a uniform manner.

BRIEF DESCRIPTION OF THE DRAWINGS

In the following, an embodiment of the invention is explained with respect to the figures.

DESCRIPTION OF THE PREFERRED EMBODIMENTS OF THE INVENTION

Figure 1:
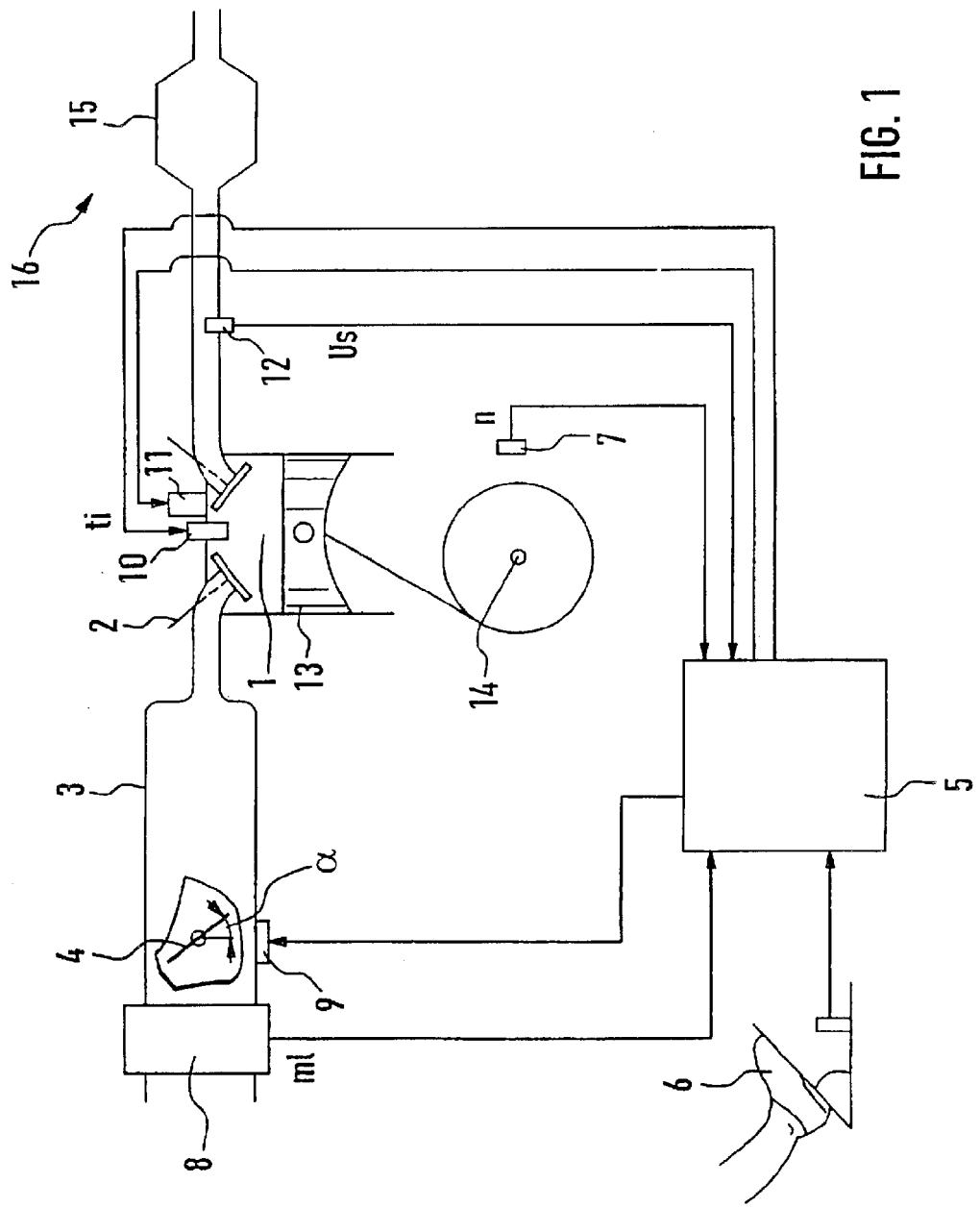
FIG. 1 shows the technical background of the invention.

In FIG. 1, 1 represents the combustion chamber of a cylinder of an internal combustion engine. The flow of air to the combustion chamber is controlled via an inlet valve 2. The air is drawn in by suction via an intake manifold 3. The intake air quantity can be varied via a throttle flap 4 which is driven by a control apparatus 5. The following are supplied to the control apparatus: signals as to the torque command of the driver (for example, via the position of an accelerator pedal 6); a signal as to the engine rpm n from an rpm transducer 7; a signal as to the quantity ml of inducted air by an air quantity sensor 8; and, a signal US as to the exhaust-gas composition and/or exhaust-gas temperature from an exhaust-gas sensor 12. The exhaust-gas sensor 12 can, for example, be a lambda probe whose Nernst voltage indicates the oxygen content in the exhaust gas and whose internal resistance can be applied as an index for the probe temperature, exhaust-gas temperature and/or catalytic converter temperature. The exhaust gas is conducted through at least one catalytic converter 15 as part of an exhaust-gas system 16 wherein toxic substances of the exhaust gas are converted and/or are temporarily stored (NOx-storage catalytic converter).

The control apparatus 5 forms output signals for adjusting the throttle flap angle ($\alpha$) via an actuating member 9 and for driving a fuel injection valve 10 via which fuel is metered into the combustion chamber. The control apparatus 5 forms these output signals from the above, and, if required, additional input signals as to other parameters of the internal combustion engine such as intake air temperature and coolant temperature, et cetera. Furthermore, a triggering of the ignition via an ignition device 11 is controlled by the control apparatus.

The throttle flap angle ($\alpha$) and the injection pulse-width (ti) are essential actuating variables, which are to be matched to each other, for realizing the desired torque, the exhaust-gas composition and the exhaust-gas temperature. A further significant actuating variable for influencing these variables is the angular position of the ignition relative to the piston movement. The determination of the actuating variables for adjusting the torque is the subject matter of U.S. Pat. No. 6,512,983 which is to be incorporated into the disclosure.

Furthermore, the control apparatus controls additional functions for achieving an efficient combustion of the air/fuel mixture in the combustion chamber, for example, an exhaust-gas recirculation (not shown) and/or tank venting. The gas force, which results from the combustion, is converted into a torque by the piston 13 and the crankshaft 14.

In this technical background, the catalytic converter temperature can be measured or can be modeled from operating variables of the engine. The modeling of temperatures in the exhaust-gas system of internal combustion engines is known, for example, from U.S. Pat. No. 5,590,521.

For heating by means of after-injection, the engine control according to the invention requires minimum temperatures in the exhaust-gas system. Until these temperatures are reached, for example, homogeneous operation with retarded ignition is requested as a first measure and adjusted. When the necessary temperatures are reached, the after-injection is permitted as a possible alternative. The switchover to stratified operation with after-injection takes place in order to generate a higher heat flow. The air flow is then throttled to the extent that the needed heat flow is reached at a requested temperature.

The throttling takes place in a first embodiment via an adjustable closing of the throttle flap by a predetermined angle or to a predetermined opening angle. Stated otherwise, the throttling takes place uncontrolled in this example. The mixture composition should be close to lambda equals 1 for a maximum release of heat. Temporary mixture enrichment to lambda values less than 1 can occur because of a dynamic driving operation with changing torque requirements. In this way, the exhaust-gas emissions are deteriorated in an unwanted manner.

To avoid an exhaust-gas deterioration, the after-injection is advantageously controlled with the aid of an exhaust-gas probe which is present. In this way, a breakthrough of rich exhaust gas can be prevented. The breakthrough is characterized by the occurrence of HC emissions rearward of the catalytic converter. As a further advantage, the exothermal energy release at lambda equals 1 is maximally utilized.

In detail, because of the heat request, a necessary fuel quantity is determined for the after-injection at maximum possible throttling. In addition to the heat request, also the air requirement of the after-injection and the temperature increase because of the throttling have to be considered. The latter is especially important to prevent overheating of components in the exhaust-gas system.

The throttling can be controlled via the measured exhaust-gas lambda as an alternative to the control of the after-injected fuel quantity via the measured exhaust-gas lambda.

Figure 2:
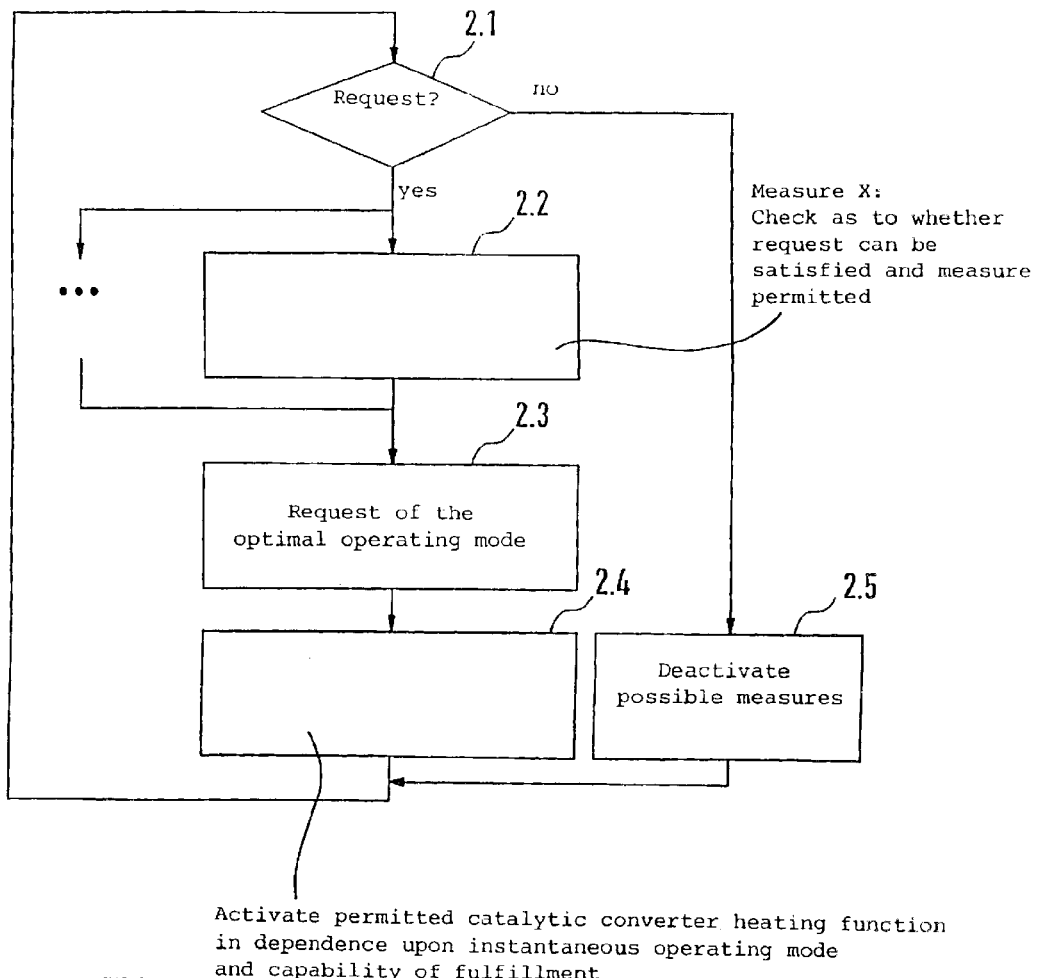
FIG. 2 shows an embodiment of the invention in the form of a flow diagram.

FIG. 2 shows an embodiment in the form of a flow diagram.

In step 2.1, a check is made as to whether a request for a catalytic converter heating measure is present. If this is the case, then, in step 2.2, an estimate for the at least one heating measure X takes place as to whether this measure can make the wanted heat effect available and whether this heating measure is permitted with a view to the exhaust-gas values and the operating mode of the internal combustion engine, which is necessary for carrying out the heating measure, in the instantaneous operating state (exhaust-gas system temperature and/or catalytic converter temperature, vehicle speed, instantaneous load).

The various heating measures are computed and evaluated based on physical requirements (heat flow and temperature).

Furthermore, the operating limits for the individual operating modes are considered. In this way, it is possible to select an optimal heating strategy for each operating state. Furthermore, a check is made for each heating measure as to whether the heating measure, with a view to the exhaust-gas values and the required operating mode, is possible in the instantaneous driving state, that is, for the instantaneous catalytic converter temperature, vehicle speed and load.

With this information, the individual heating measures can be evaluated in dependence upon the operating state and a decision can be made for the best measure. The evaluation of a heating measure takes place with the present request in a slow time raster for each heating measure. The necessary interventions are computed in a rapid time raster only for the activated heating measure in order to save computation time.

If necessary, the request for the required optimal operating mode takes place in step 2.3. For example, after-injection in the stratified operation cannot be optimal for a cold exhaust-gas system because in an exhaust-gas system which is too cold, the necessary after-reaction of the resulting mixture in the exhaust gas cannot take place. Catalytic converters which are too cold can especially not support the after-reaction in the exhaust-gas system. In this case, a deterioration of efficiency because of retarded ignition would be appropriate to increase the exhaust-gas temperature. This can be preferably carried out in the operating mode with homogenous operation. Correspondingly, in step 2.3, a switchover can take place into the homogeneous operation.

Thereafter, the activation of the selected heating measure takes place in step 2.4.

If, in contrast, the inquiry in step 2.1 is negative, then no request of a heating measure takes place and possibly activated heating measures are deactivated.

What is claimed is:

1. A method for heating a catalytic converter in the exhaust gas of an internal combustion engine, which can be operated in different operating modes, and wherein at least one of several heating measures can be selected to heat the catalytic converter, the method comprising the steps of:

making an estimate of said several heating measures as to whether an individual one of said heating measures can provide the wanted heating effect;

estimating whether an individual one of said heating measures is at all permissible in the instantaneous operating state with a view to the exhaust-gas values and the particular operating mode of the internal combustion engine, which is necessary for carrying out the heating measure;

requesting the operating mode of said engine wherein requirements can be best satisfied; and, activating at least a permitted one of said heating measures in each case in dependence upon the instantaneous operating mode.

2. The method of claim 1, wherein, as a measure, a deterioration of the efficiency of the engine combustion takes place via a change of the ignition angle.

3. The method of claim 1, wherein, as a further measure in an engine having gasoline-direct injection, a fuel after-injection takes place after the combustion.

4. The method of claim 3, wherein the after-injection is combined with stratified operation.

5. The method of claim 4, wherein the air quantity, which is inducted by the engine, is throttled to the extent that the needed heat flow is reached with a requested temperature.

6. The method of claim 1, wherein an exhaust-gas composition is adjusted for the heating of an NOx-storage catalytic converter in homogeneous operation, the exhaust-gas composition deviating from the stoichiometric exhaust-gas composition.

7. The method of claim 1, wherein said requirements include exhaust-gas values.

8. An arrangement for heating a catalytic converter in the exhaust gas of an internal combustion engine, which can be operated in different operating modes, and wherein at least one of several heating measures can be selected to heat the catalytic converter, the arrangement comprising:

means for making an estimate of said several heating measures as to whether an individual one of said heating measures can provide the wanted heating effect;

means for estimating whether an individual one of said heating measures is at all permissible in the instantaneous operating state with a view to the exhaust-gas values and the particular operating mode of the internal combustion engine, which is necessary for carrying out the heating measure;

means for requesting the operating mode of said engine wherein requirements can be best satisfied; and, means for activating at least a permitted one of said heating measures in each case in dependence upon the instantaneous operating mode.

9. The arrangement of claim 8, wherein said requirements include exhaust-gas values.

* * * * *